United States Patent [19]

Hobbs

[11] Patent Number: 4,529,485
[45] Date of Patent: Jul. 16, 1985

[54] CONSTRAINT CONTROL OF A FRACTIONAL DISTILLATION PROCESS

[75] Inventor: James W. Hobbs, Sweeny, Tex.

[73] Assignee: Phillip Petroleum Company, Bartlesville, Okla.

[21] Appl. No.: 496,784

[22] Filed: May 20, 1983

Related U.S. Application Data

[62] Division of Ser. No. 315,601, Oct. 30, 1981, Pat. No. 4,400,239.

[51] Int. Cl.³ .............................................. B01D 3/42
[52] U.S. Cl. .......................................... 203/2; 62/21; 203/DIG. 18; 208/DIG. 1
[58] Field of Search ...................... 364/501; 202/160; 203/1, 2, DIG. 18, 24, 26; 196/132; 208/DIG. 1; 62/21, 37, 24, 26, 30

[56] References Cited

U.S. PATENT DOCUMENTS 3,225,551 12/1965 Kelly ........................................ 62/24

Primary Examiner—Frank Sever
Attorney, Agent, or Firm—French and Doescher

[57] ABSTRACT

A fractional distillation process, in which the flow rate of the external reflux is utilized to control the bottoms product composition, is controlled so as to maintain a desired bottoms product composition to the extent that maintaining the desired bottoms product composition does not cause a process constraint to be violated. A plurality of actual process conditions are compared to process constraints for those process conditions to determine if the flow rate of the external reflux should remain the same, be increased by an incremental amount or be decreased by an incremental amount. The order of the comparison of process constraints to actual process conditions is such that the most important comparison will control the external reflux low rate if that comparison indicates that a process constraint has been violated.

5 Claims, 3 Drawing Figures

CONSTRAINT CONTROL OF A FRACTIONAL DISTILLATION PROCESS

This application is a divison of application Ser. No. 315,601, filed Oct. 30, 1981 now U.S. Ser. No. 4,400,239.

This invention relates to control of a fractional distillation process. In one aspect, this invention relates to method and apparatus for controlling a fractional distillation process in which the overhead reflux flow rate is manipulated to control the bottoms product composition.

Fractional distillation columns are employed in many chemical manufacturing processes to make desired separations. Typically, at least an overhead product and a bottoms product are removed from the fractional distillation process. The composition of the overhead product can be controlled by manipulating the bottoms product flow rate in response to an analysis of the overhead product while the composition of the bottoms product can be controlled by manipulating the flow rate of the external reflux in response to an analysis of the bottoms product.

Direct control of the overhead reflux based on an analysis of the bottoms product may result in loss of control of the fractional distillation process during periods of process upsets. For example, a sudden increase in the feed flow rate may cause control based on only an analysis of the bottoms product to increase the external reflux to the point that the fractional distillation column is flooded. Also, on hot days direct control of the external reflux based on an analysis of the bottoms product may cause condensing limitations to be exceeded which causes a loss of pressure control of the tower. Also, if the overhead product is more valuable than the bottoms product, direct control of the external reflux based on an analysis of the bottoms product may interfere with control of the overhead product composition which is undesirable from an economic standpoint.

It is thus an object of this invention to provide method and apparatus for controlling a fractional distillation process in which the overhead reflux flow rate is manipulated to control the bottoms product composition without violating a process constraint, causing loss of control of the fractional distillation process, or interfering with the control of the overhead product if the overhead product is more valuable than the bottoms product.

In accordance with the present invention, method and apparatus is provided whereby a plurality of actual process conditions are compared to process constraints for those process conditions to determine if the flow rate of the external reflux should remain the same, be increased by an incremental amount or be decreased by an incremental amount. The order of the comparison of process constraints to actual process conditions is such that the most important comparison will control the external reflux flow rate if that comparison indicates that a process constraint has been violated. In this manner, the flow rate of the external reflux is manipulated in such a manner that a desired bottoms product composition is maintained to the extent that maintaining the desired bottoms product composition does not cause a process constraint to be violated.

Other objects and advantages of the invention will be apparent from the foregoing brief description of the invention and the appended claims as well as from the detailed description of the drawings in which:

The invention is illustrated and described in terms of a specific fractional distillation process for the separation of isopentane from normal pentane. The invention is also applicable to different types and configurations of fractional distillation processes in which the flow rate of the external reflux is utilized to control a bottoms product composition.

Figure 1:
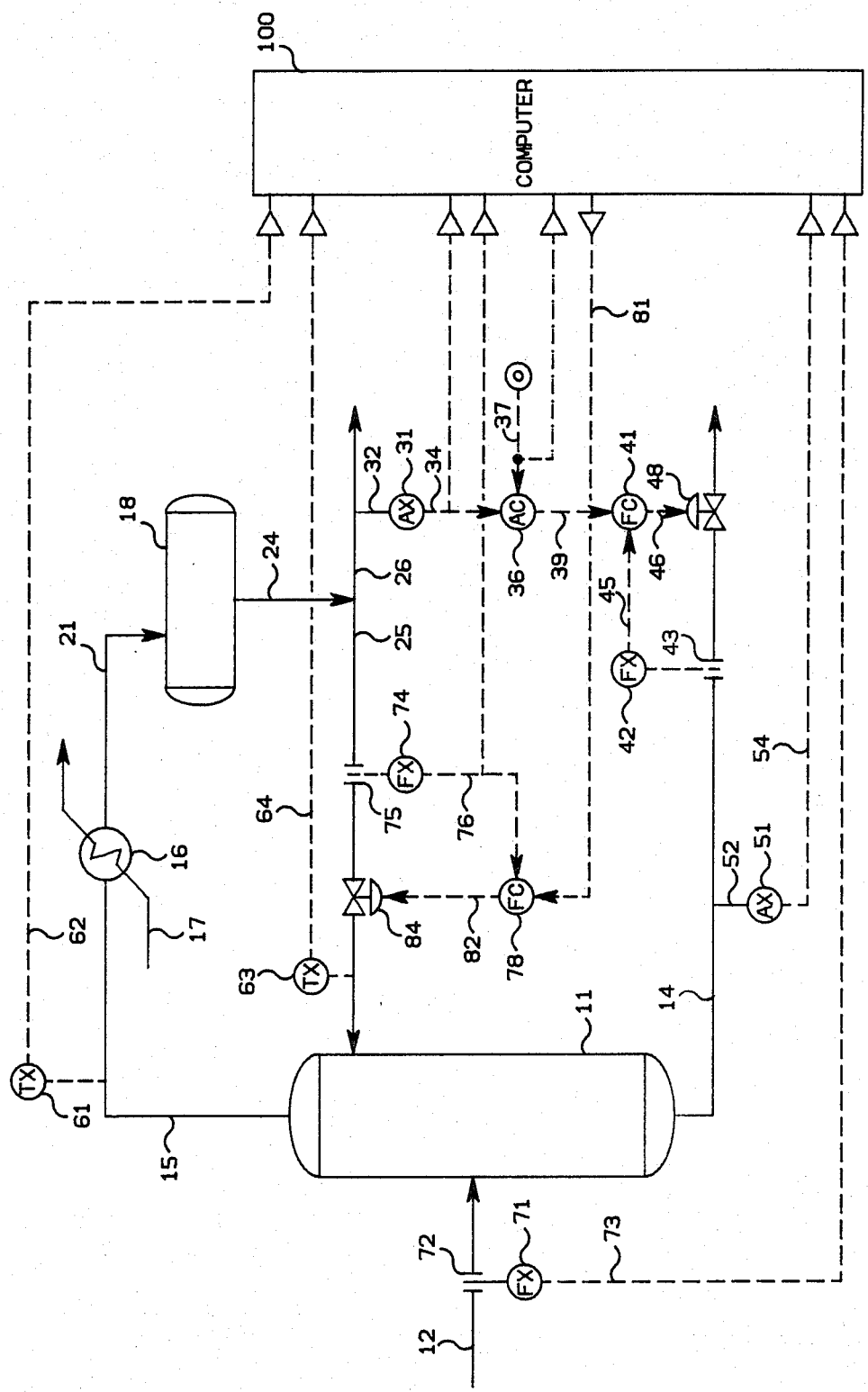
FIG. 1 is a diagrammatic illustration of a fractional distillation process with the associated control system of the present invention.

A specific control system configuration is set forth in FIG. 1 for the sake of illustration. However, the invention extends to different types of control system configurations which accomplish the purpose of the invention. Lines designated as signal lines in the drawings are electrical or pneumatic in this preferred embodiment. Generally, the signals provided from any transducer are electrical in form. However, the signals provided from flow sensors will generally be pneumatic in form. Transducing of these signals is not illustrated for the sake of simplicity because it is well known in the art that if a flow is measured in pneumatic form it must be transduced to electrical form if it is to be transmitted in electrical form by a flow transducer. Also, transducing of the signals from analog form to digital form or from digital form to analog form is not illustrated because such transducing is also well known in the art.

The invention is also applicable to mechanical, hydraulic or other signal means for transmitting information. In almost all control systems some combination of electrical, pneumatic, mechanical or hydraulic signals will be used. However, use of any other type of signal transmission, compatible with the process and equipment in use, is within the scope of the invention.

A digital computer is used in the preferred embodiment of this invention to calculate the required control signal based on measured process parameters as well as set points supplied to the computer. Analog computers or other types of computing devices could also be used in the invention. The digital computer is preferably an OPTROL 7000 Process Computer System from Applied Automation, Inc., Bartlesville, Okla.

Signal lines are also utilized to represent the results of calculations carried out in a digital computer and the term "signal" is utilized to refer to such results. Thus, the term signal is used not only to refer to electrical currents or pneumatic pressures but is also used to refer to binary representations of a calculated or measured value.

The controllers shown may utilize the various modes of control such as proportional, proportional-integral, proportional-derivative, or proportional-integral-derivative. In this preferred embodiment, proportional-integral-derivative controllers are utilized but any controller capable of accepting two input signals and producing a scaled output signal, representative of a comparison of the two input signals, is within the scope of the invention.

The scaling of an output signal by a controller is well known in control system art. Essentially, the output of a controller may be scaled to represent any desired factor or variable. An example of this is where a desired flow rate and an actual flow rate are compared by a controller. The output could be a signal representative of a desired change in the flow rate of some gas necessary to make the desired and actual flows equal. On the other hand, the same output signal could be scaled to represent a percentage or could be scaled to represent a temperature change required to make the desired and actual flows equal. If the controller output can range from 0 to 10 volts, which is typical, then the output signal could be scaled so that an output signal having a voltage level of 5.0 volts corresponds to 50 percent, some specified flow rate, or some specified temperature.

The various transducing means used to measure parameters which characterize the process and the various signals generated thereby may take a variety of forms or formats. For example, the control elements of the system can be implemented using electrical analog, digital electronic, pneumatic, hydraulic, mechanical or other similar types of equipment or combinations of one or more such equipment types. While the presently preferred embodiment of the invention preferably utilizes a combination of pneumatic final control elements in conjunction with electrical analog signal handling and translation apparatus, the apparatus and method of the invention can be implemented using a variety of specific equipment available to and understood by those skilled in the process control art. Likewise, the format of the various signals can be modified substantially in order to accommodate signal format requirements of the particular installation, safety factors, the physical characteristics of the measuring or control instruments and other similar factors. For example, a raw flow measurment signal produced by a differential pressure orifice flow meter would ordinarily exhibit a generally proportional relationship to the square of the actual flow rate. Other measuring instruments might produce a signal which is proportional to the measured parameter, and still other transducing means may produce a signal which bears a more complicated, but known, relationship to the measured parameter. Regardless of the signal format or the exact relationship of the signal to the parameter which it represents, each signal representative of a measured process parameter or representative of a desired process value will bear a relationship to the measured parameter or desired value which permits designation of a specific measured or desired value by a specific signal value. A signal which is representative of a process measurement or desired process value is therefore one from which the information regarding the measured or desired value can be readily retrieved regardless of the exact mathematical relationship between the signal units and the measured or desired process units.

Referring now to the drawings and in particular FIG. 1, there is illustrated a fractional distillation column 11. A feed stream consisting essentially of isopentane and normal pentane is provided to the fractional distillation column 11 through conduit means 12. Normal pentane is removed as a bottoms product through conduit means 14. Isopentane is removed in an overhead vapor stream from the fractional distillation column 11 through conduit means 15. It is noted that, while the bottoms product stream will consist principally of normal pentane, it will also contain some concentration of isopentane. In like manner, the overhead product will contain some concentration of normal pentane.

The overhead stream flowing through conduit means 15 is provided from the fractional distillation column 11 through conduit means 15 to the heat exchanger 16. The heat exchanger 16 is provided with a cooling medium through conduit means 17. The at least partially condensed fluid stream from the heat exchanger 16 is provided to the overhead accumulator 18 through conduit means 21. A first portion of the liquid in the overhead accumulator 18 is provided through the combination of conduit means 24 and 25 as an external reflux to the fractional distillation column 11. A second portion of the liquid in the accumulator 18 is removed through the combination of conduit means 24 and 26 as the overhead product.

The fractional distillation process for separating isopentane from normal pentane described to this point is conventional. It is the manner in which the fractional distillation process is controlled so as to maintain a desired bottoms product composition while not violating any process constraints and maintaining various process operating conditions at desired values which provides the novel features of the present invention.

Analyzer transducer 31, which is preferably a Model 102 Process Chromatograph manufactured by Applied Automation, Inc., Bartlesville, Okla., is in fluid communication with conduit means 26 through conduit means 32. The analyzer transducer 31 provides an output signal 34 which is representative of the concentration of normal pentane in the isopentane product flowing through conduit means 26. Signal 34 is provided from the analyzer transducer 31 as the process variable input to the analyzer controller 36 and is also provided as an input to computer means 100.

The analyzer controller 36 is also provided with signal 37 which is representative of the desired concentration of normal pentane in the isopentane product. Essentially, by specifying the concentration of normal pentane, the purity of the overhead product stream is specified. Signal 37 is also provided as an input to computer means 100.

In response to signals 34 and 37, the analyzer controller 36 provides an output signal 39 which is responsive to the difference between signals 34 and 37. Signal 39 is scaled so as to be representative of the flow rate of the bottoms product flowing through conduit means 14 required to maintain the actual concentration of normal pentane in the overhead product substantially equal to the desired concentration represented by signal 37. Signal 39 is provided as the set point signal to the flow controller 41.

The flow transducer 42 in combination with the flow sensor 43, which is operably located in conduit means 14, provides an output signal 45 which is representative of the actual flow rate of the bottoms product flowing through conduit means 14. Signal 45 is provided as the process variable input to the flow controller 41. In response to signals 39 and 45, the flow controller 41 provides an output signal 46 which is responsive to the difference between signals 39 and 45. Signal 46 is scaled so as to be representative of the position of the control valve 48, which is operably located in conduit means 14, required to maintain the actual flow rate of the bottoms product substantially equal to the desired flow rate as represented by signal 39. Signal 46 is provided from the flow controller 41 as a control signal to the control valve 48.

Analyzer transducer 51, which is also preferably a Model 102 Process Chromatograph, is in fluid communication with conduit means 14 through conduit means 52. The analyzer transducer 51 provides an output signal 54 which is representative of the concentration of isopentane in the normal pentane product flowing through conduit means 14. Again, by specifying the concentration of isopentane in the bottoms product stream, the purity of the bottoms product stream is specified. Signal 54 is provided from the analyzer transducer 51 as an input to computer means 100.

Temperature transducer 61 in combination with a temperature measuring device such as a thermocouple, which is operably located in conduit means 15, provides an output signal 62 which is representative of the actual temperature of the overhead stream flowing through conduit means 15. Signal 62 is provided from temperature transducer 61 as an input to computer means 100. In like manner, temperature transducer 63 provides an output signal 64, which is representative of the actual temperature of the external reflux flowing through conduit means 25, to computer means 100.

Flow transducer 71 in combination with the flow sensor 72, which is operably located in conduit means 12, provides an output signal 73 which is representative of the actual flow rate of the feed stream flowing through conduit means 12. Signal 73 is provided from the flow transducer 71 as an input to computer means 100. In like manner, flow transducer 74 in combination with flow sensor 75 provides an output signal 76 which is representative of the actual flow rate of the external reflux flowing through conduit means 25. Signal 76 is provided from the flow transducer 74 as an input to computer means 100 and as the process variable input to the flow controller 78.

In response to the described input signals, computer means 100 calculates a set point for the external reflux flow rate. Signal 81, which is representative of the calculated set point, is provided as the set point signal to the flow controller 78. In response to signals 76 and 81, the flow controller 78 provides an output signal 82 which is responsive to the difference between signals 76 and 81. Signal 82 is scaled so as to be representative of the position of the control valve 84, which is operably located in conduit means 25, required to maintain the actual flow rate of the external reflux substantially equal to the desired flow rate as represented by signal 81. Signal 82 is provided as a control signal to the control valve 84.

Figure 2:
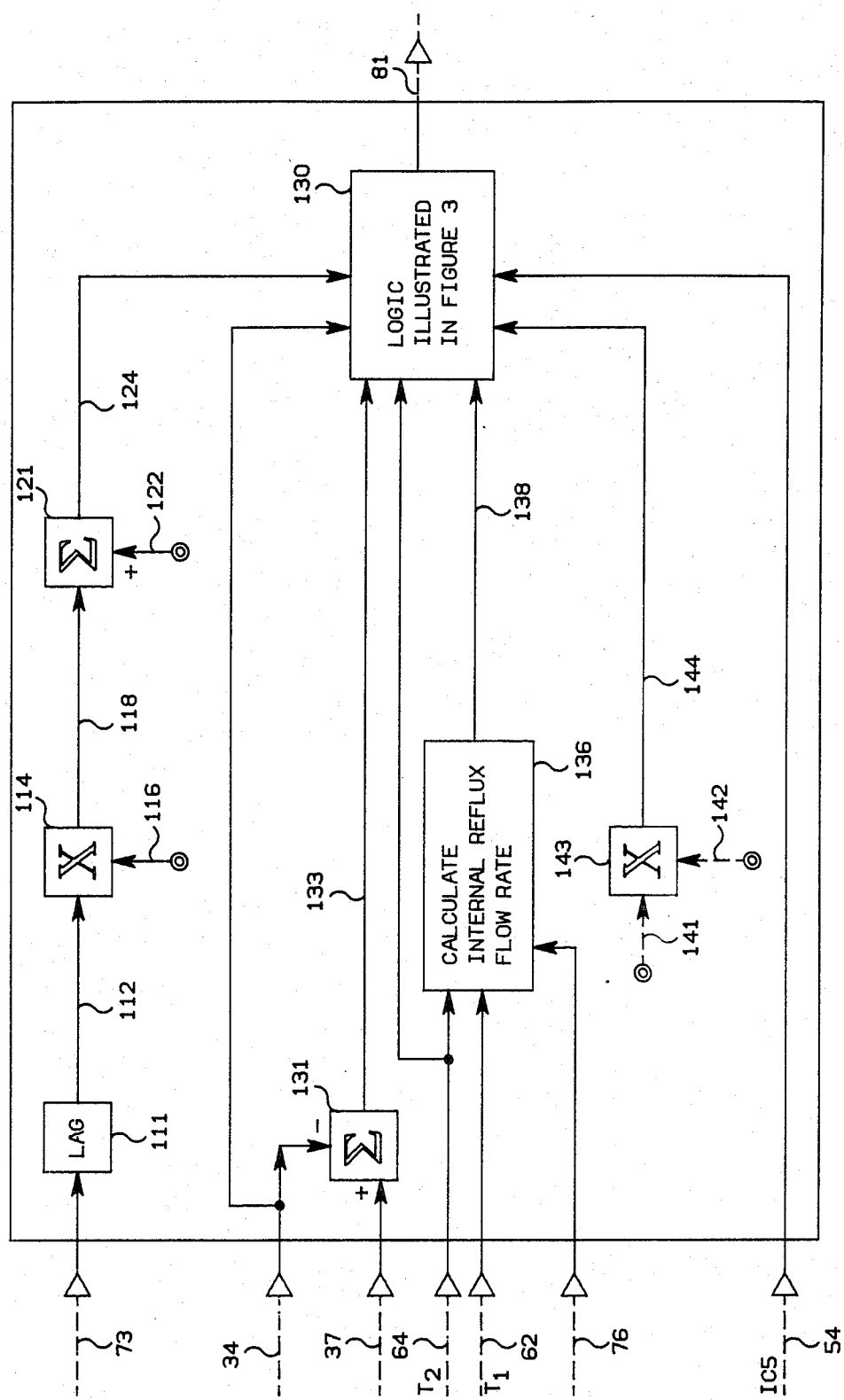
FIG. 2 is a representation of computer logic suitable for the calculation of the process variables utilized in the constraint control.

Referring now to FIG. 2, signal 73, which is representative of the flow rate of the feed flowing through conduit means 12 to the fractional distillation column 11, is provided as an input to the lag block 111. The lag block 111 is utilized to account for the time delay required for the propagation of the feed to the position of conduit means 32. The output signal 112 from the lag block 111 is thus representative of the flow rate of the feed delayed by the action of one or several time constants and/or dead times as required for the fractional distillation column 11. The propagation delay through the fractional distillation process is usually reasonably well known at least to the extent that the propagation delays can be estimated with reasonable accuracy. The propagation delay can also be calculated based on capacities of the trays in the fractional distillation column 11 and the physical dimensions of the fractional distillation process equipment to determine when a change in the feed flow rate at the feed inlet will be observed in conduit means 32.

Signal 112 is provided from the lag block 111 as one input to the multiplying block 114. The multiplying block 114 is also provided with an operator entered set point signal 116 which is representative of the desired ratio between the overhead product flow rate and the feed flow rate. Signal 112 is multiplied by signal 116 to establish signal 118. It is noted that signal 118 is essentially representative of the flow rate of the overhead product flowing through conduit means 26. A direct measurement of this flow rate could be utilized if desired but was not utilized in the present invention because the measurement was not available on the particular fractional distillation column to which the present control invention was applied.

Signal 118 is supplied from the multiplying block 114 to the subtrahend input of the summing block 121. Signal 122, which is representative of an operator entered high limit for the flow rate of the vapor through conduit means 15, is supplied to the minuend input of the summing block 121. Signal 118 is subtracted from signal 122 to establish signal 124 which is representative of a high limit on the internal reflux flow rate which will prevent flooding of the fractional distillation column 11. Signal 124 is provided from the summing block 121 as an input to the logic block 130.

Signal 34, which is representative of the actual concentration of normal pentane in the overhead product stream, is provided to the subtrahend input of the summing block 131 and is also provided as an input to the logic block 130. Signal 37, which is representative of the set point for the concentration of normal pentane in the overhead product stream, is provided to the minuend input of the summing block 131. Signal 34 is subtracted from signal 37 to establish signal 133 which is representative of the difference between the actual and desired concentration of normal pentane in the overhead product stream. Signal 133 is provided from the summing block 131 as an input to the logic block 130. It is noted that it is preferred to use the difference between the actual and desired concentrations in the summing block 130 for control sensitivity but the actual concentration of normal pentane could be utilized in place of the difference as will be more fully described hereinafter.

Signal 64, which is representative of the actual temperature of the external reflux, is provided as an input to the calculate internal reflux flow rate block 136 and is also provided as an input to the logic block 130. Signal 62, which is representative of the actual temperature of the overhead vapor stream flowing through conduit means 15, is provided as input to the calculate internal reflux flow rate block 136. Also, signal 76 which is representative of the flow rate of the external reflux is provided as an input to the calculate internal reflux flow rate block 136.

The actual internal reflux flow rate is calculated by solving the known equation $$R_i = R(1 + K\Delta T) \tag{1}$$

where $R_i$ is the internal reflux flow rate,

R is the flow rate of the external reflux, $\Delta T$ is the difference between the temperatures of the overhead stream and the external reflux, and K is equal to the special heat of the external reflux divided by the heat of vaporization for the external reflux. This equation is developed in Computer Control of Distillation Reflux, ISA Journal, June, 1959, pages 34–39 by D. E. Lupfer and D. E. Berger.

The constant K can be easily calculated and for the particular fractional distillation process to which the present control invention was applied, the constant K was equal to 0.004. Signal 138, which is representative of the actual internal reflux flow rate as calculated from Equation (1), is provided from the calculate internal reflux flow rate block 136 to the logic block 130.

As has been previously stated, the flow rate of the external reflux will remain constant, be increased by an increment or be decreased by an increment. The increment by which the flow rate may be increased or decreased is calculated by multiplying signal 141, which is representative of the desired rate of reflux change in barrels per hour/hour by signal 142 which is representative of the time interval between updating of the set point signal 81. Both signal 141 and signal 142 are operator entered values. A typical value for signal 141 is 100 BPH/HR. A typical value for signal 142 is 1/180 HR (1/3 minute).

Signal 144, which is representative of the result of the multiplication is provided from the multiplying block 143 as an input to the logic block 130. Signal 54, which is representative of the actual concentration of isopentane in the bottoms product stream, is also provided as an input to the logic block 130.

Figure 3:
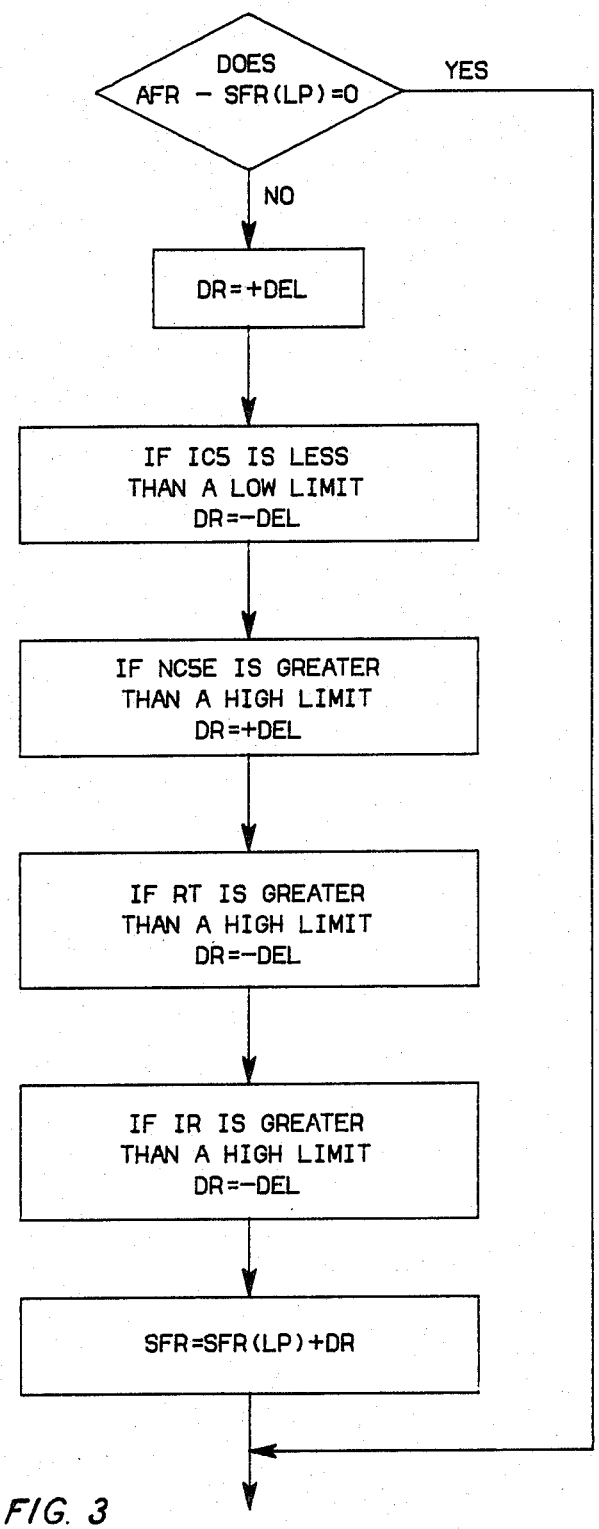
FIG. 3 is a logic diagram for the constraint control utilized to generate the set point for the external reflux flow rate.

The various inputs, illustrated in FIG. 2, to the logic block 130 are utilized in the logic diagram illustrated in FIG. 3 to determine an updated value for the set point signal 81. Symbols utilized in FIG. 3 are defined as follows:

AFR = signal 34;
SFR(LP) = the current value of signal 81 from the last updating of signal 81;
DEL = signal 144;
IC5 = signal 54;
NC5E = signal 133;
RT = signal 64;
IR = signal 138; and
SFR = updated value of signal 81.

Referring now FIG. 3, a determination is first made as to whether the actual flow rate of the external reflux is equal to the set point for the external reflux from the last pass through the computer. If the actual flow rate is equal to the set point, the logic illustrated in FIG. 3 is bypassed and the new set point will be equal to the old set point.

If the actual flow rate is not equal to the set point, then the term DR is set equal to +DEL. This will cause the flow rate of the external reflex to be increased by the increment DEL if the actual flow rate is not equal to the set point and no limit is violated.

The actual concentration of isopentane in the bottoms product is then compared to an operator entered low limit for the isopentane concentration in the bottoms product. If the actual concentration of isopentane is less than the low limit, then the term DR is set equal to −DEL.

The difference between the actual concentration of normal pentane in the overhead product and the desired concentration of normal pentane is then compared to an operator entered high limit for the difference. If the difference is greater than the high limit then the term DR is set equal to +DEL. As has been previously stated, the actual concentration of normal pentane could be used in place of the difference if desired. The limit used would be a high limit on normal pentane concentration rather than a high limit on the difference.

The actual temperature of the external reflux is then compared to an operator entered high limit for the temperature of the external reflux. If the actual temperature is greater than the high limit, then the term DR is set equal to −DEL.

The actual internal reflux flow rate is then compared to the high limit on the internal reflux flow rate. If the actual internal reflux is greater than the high limit, then the term DR is set equal to −DEL. An updated value for signal 81 is then calculated by adding the results of the logic flow illustrated in FIG. 3 to the current value for signal 81.

It is noted that more than one limit might be violated. However, the last block in the logic sequence will have priority in setting the sign for the term DEL. Thus, the highest priority is placed on prevention of flooding of the fractional distillation column by not allowing the internal reflux to exceed a high limit. A second priority is placed on the external reflux temperature because an excess temperature may cause condensing limitations to be exceeded which will result in a loss of pressure control for the fractional distillation column. The next priority is placed on not allowing the control of the external reflux flow rate to interfere with control of the overhead product composition since the overhead product is the more valuable product. The final priority is placed on controlling the bottoms product composition.

It is noted that additional logic might be utilized in FIG. 3 if desired to prevent the external reflux flow rate from exceeding a high and low limit. This could be done simply by comparing the set point SFR to a high and low limit and setting the set point SFR equal to either a high or low limit if either limit was violated.

While the control using four constraints is desired, only the two highest priority constraints are considered to be actually required. This is especially true if the value of the overhead product is not considerably greater than the value of the bottoms product. Thus, control of the external reflux to prevent flooding and to prevent loss of pressure control are considered essential. Control of the external reflux to prevent interference with the control of the overhead product is considered desirable as is control of the bottoms product composition so as to prevent the isopentane concentration from going below a low limit. To a certain extent, the lower priority constraints can be omitted because the direct control of the overhead product composition will indirectly influence the bottoms product composition.

The invention has been described in terms of a preferred embodiment as illustrated in FIGS. 1–3. Specific components used in the practice of the invention as illustrated in FIG. 1 such as flow sensors 43, 72 and 75; flow transducers 42, 71 and 74; flow controllers 41 and 78; analyzer controller 36; temperature transducers 61 and 63; and control valves 48 and 84 are each well known, commercially available control components such as are described at length in Perry's *Chemical Engineer's Handbook*, 4th Edition, Chapter 22, McGraw-Hill.

For reasons of brevity, conventional auxilliary fractionation equipment such as pumps, heat exchangers, additional measurement-control devices, etc. have not been included in the above description as they play no part in the explanation of the invention. Also, the manner in which heat is supplied to the fractional distillation column has not been illustrated.

While the invention has been described in terms of the presently preferred embodiment, reasonable variations and modifications are possible by those skilled in the art and such variations and modifications are within That which is claimed is:

1. A method for controlling a fractional distillation process utilized to separate first and second components contained in a feed stream flowing to a fractional distillation column, wherein said first component is principally removed from said fractional distillation column as an overhead vapor stream, wherein said overhead vapor stream is at least partially condensed with a first portion of the condensate being returned to an upper portion of said fractional distillation column as an external reflux and a second portion of said condensate being removed from said fractional distillation process as an overhead product, and wherein said second component is principally removed from said fractional distillation column as a bottoms product, said method comprising the steps of:

manipulating the flow rate of said external reflux in response to the current value of a periodically updated first signal which is representative of the desired flow rate of said external reflux;

establishing a second signal representative of the actual flow rate of said external reflux;

using computing means to compare said second signal to the current value of said first signal;

using computing means to establish an updated first signal which is equal to the current value of said first signal if the current value of said first signal is equal to the value of said second signal;

using computing means to establish a third signal representative of the actual flow rate of the internal reflux in an upper portion of said fractional distillation column;

establishing a fourth signal representative of high limit on the actual flow rate of said internal reflux;

using computing means to compare said third signal and said fourth signal;

using computing means to add an incremental value to the current value of said first signal to establish an updated first signal if said third signal is greater than said fourth signal and said second signal is not equal to the current value of said first signal;

establishing a fifth signal representative of the actual temperature of said external reflux;

establishing a sixth signal representative of a high limit on the actual temperature of said external reflux;

using computing means to compare said fifth signal and said sixth signal; and using computing means to subtract an incremental value from the current value of said first signal to establish an updated first signal if said fifth signal is greater than said sixth signal, said third signal is not greater than said fourth signal and said second signal is not equal to the current value of said first signal. value of said first signal;

2. A method in accordance with claim 1 additionally comprising the steps of:

establishing a seventh signal representative of the concentration of said second component in said overhead product stream;

establishing an eighth signal representative of the desired concentration of said second component in said overhead product stream;

using computing means to establish a ninth signal representative of the difference between said seventh signal and said eighth signal;

establishing a tenth signal representative of a high limit on the difference between said seventh signal and said eighth signal;

using computing means to compare said ninth signal and said tenth signal; and using computing means to add an incremental value to the current value of said first signal to establish an updated first signal if said ninth signal is greater than said tenth signal, said fifth signal is not greater than said sixth signal, said third signal is not greater than said fourth signal, and said second signal is not equal to the current value of said first signal.

3. A method in accordance with claim 2 additionally comprising the steps of:

establishing an eleventh signal representative of the actual concentration of said first component in said bottoms product stream;

establishing a twelfth signal representative of a low limit on the actual concentration of said second component in said bottoms product stream; and using computing means to compare said eleventh signal and said twelfth signal;

using computing means to subtract an incremental value from the current value of said first signal to establish an updated first signal if said eleventh signal is less than said twelfth signal, said ninth signal is not greater than said tenth signal, said fifth signal is not greater than said sixth signal, said third signal is not greater than said fourth signal, and said second signal is not equal to the current value of said first signal; and using computing means to add an incremental value to the current value of said first signal to establish an updated first signal if said eleventh signal is not less than said twelfth signal, said ninth signal is not greater than said tenth signal, said fifth signal is not greater than said sixth signal, said third signal is not greater than said fourth signal, and said second signal is not equal to the current value of said first signal.

4. A method in accordance with claim 3 additionally comprising the steps of:

using computing means to compare said seventh signal and said eighth signal and to establish a thirteenth signal which is responsive to the difference between said seventh signal and said eighth signal, wherein said thirteenth signal is scaled so as to be representative of the flow rate of said bottoms product stream required to maintain the actual concentration of said second component in said overhead product stream substantially equal to the desired concentration;

establishing a fourteenth signal representative of the actual flow rate of said bottoms product stream;

using computing means to compare said thirteenth signal and said fourteenth signal and to establish a fifteenth signal which is responsive to the difference between said thirteenth signal and said fourteenth signal; and manipulating the flow rate of said bottoms product stream in response to said fifteenth signal.

5. A method in accordance with claim 4 wherein said step of manipulating the flow rate of said external reflux in response to the current value of said periodically updated first signal comprises;

establishing a sixteenth signal representative of the actual flow rate of said external reflux;

using computing means to compare the current value of said periodically updated first signal and said sixteenth signal and to establish a seventeenth signal which is responsive to the difference between the current value of said periodically updated first signal and said sixteenth signal; and manipulating the flow rate of said external reflux in response to said seventeenth signal.

* * * * *